United States Patent
Nguyen

(10) Patent No.: US 7,171,454 B2
(45) Date of Patent: Jan. 30, 2007

(54) METHOD FOR PROVIDING REAL-TIME PRODUCTION INFORMATION USING IN-SITU WEB SERVICES EMBEDDED IN ELECTRONIC PRODUCTION EQUIPMENT

(75) Inventor: Tuan Minh Nguyen, Munich (DE)

(73) Assignee: Siemens Energy & Automation, Inc., Norcross, GA (US)

( * ) Notice: Subject to any disclaimer, the term of this patent is extended or adjusted under 35 U.S.C. 154(b) by 0 days.

(21) Appl. No.: 10/899,950

(22) Filed: Jul. 27, 2004

(65) Prior Publication Data

US 2005/0038916 A1 Feb. 17, 2005

Related U.S. Application Data

(60) Provisional application No. 60/494,716, filed on Aug. 13, 2003, provisional application No. 60/494,715, filed on Aug. 13, 2003.

(51) Int. Cl.
G06F 15/16 (2006.01)
G06F 19/00 (2006.01)
G05B 15/00 (2006.01)

(52) U.S. Cl. .................. 709/218; 709/203; 709/230; 700/83; 700/121; 700/180

(58) Field of Classification Search .............. 700/95, 700/96, 121, 180, 182, 83; 709/217–219, 709/223–225, 250, 230, 238, 203; 707/10
See application file for complete search history.

(56) References Cited

U.S. PATENT DOCUMENTS 6,112,246 A * 8/2000 Horbal et al. ............... 709/230
6,453,210 B1 * 9/2002 Belotserkovskiy et al. ... 700/96
6,479,792 B1 * 11/2002 Beiermann et al. ....... 219/130.5
6,633,787 B1 * 10/2003 Sekitani ........................ 700/96
6,757,568 B2 * 6/2004 Birzer et al. .................. 700/18
6,882,980 B1 * 4/2005 Schuller ....................... 705/26
6,915,330 B2 * 7/2005 Hardy et al. ................ 709/203
2002/0002551 A1 * 1/2002 Dears
2002/0026257 A1 2/2002 Newmark ................... 700/108
2002/0046239 A1 4/2002 Stawikowski et al. ...... 709/203
2002/0152210 A1 10/2002 Johnson et al. ................ 709/9
2002/0174178 A1 * 11/2002 Stawikowski
2003/0023333 A1 * 1/2003 Birkle (Continued)

FOREIGN PATENT DOCUMENTS

FR 2844414 A1 * 3/2004

(Continued)

OTHER PUBLICATIONS

"Making Sense of CAMX Initiatives", Electronic Packaging and Production, Cahners Publishing Co., Newton, MASS; vol. 42, No. 11, Nov. 2002; pp. 20-22,24; XP001144938.

(Continued)

Primary Examiner—Crystal J. Barnes

(57) ABSTRACT

Electronics assembly equipment 12 includes a controller 13 including computer readable medium having stored thereon, executable instructions defining at least one web service 10. The web service includes information relating to the equipment. The equipment also includes a web service interface 16 associated with the controller 13 so that the web service 10 is accessible via Internet Protocol by a subscriber.

22 Claims, 2 Drawing Sheets

U.S. PATENT DOCUMENTS

| | | | |
|---|---|---|---|
| 2003/0028827 A1* | 2/2003 | Gray | 714/46 |
| 2003/0093468 A1 | 5/2003 | Gordon et al. | 709/203 |
| 2003/0114948 A1 | 6/2003 | Hellemann et al. | 700/100 |
| 2003/0118353 A1 | 6/2003 | Baller et al. | 399/8 |
| 2003/0135557 A1 | 7/2003 | Davis | 709/206 |
| 2003/0195646 A1* | 10/2003 | Yang et al. | |
| 2003/0204560 A1* | 10/2003 | Chen et al. | |
| 2003/0220809 A1* | 11/2003 | Komine et al. | 705/1 |
| 2004/0039466 A1* | 2/2004 | Lilly et al. | 700/95 |
| 2004/0128375 A1* | 7/2004 | Rockwell | |
| 2004/0162887 A1* | 8/2004 | Dillon et al. | |
| 2004/0204775 A1* | 10/2004 | Keyes et al. | |
| 2005/0021839 A1* | 1/2005 | Russell et al. | 709/238 |
| 2005/0143850 A1* | 6/2005 | Pavlik et al. | 700/83 |

FOREIGN PATENT DOCUMENTS

| | | | |
|---|---|---|---|
| KR | 2004107237 A | * | 12/2004 |

OTHER PUBLICATIONS

"Web Integration of Factory Communication Systems using an XML Framework", ISIE 2002, Proceedings of the 2002 IEEE Int'l Symposium on Ind. Electronics, vol. 1, Jul. 8, 2002; pp. 146-151; XP010598161.

"Interface for Distributed Automation IDA", ETFA 2001, 8th Int'l Conference on Emerging Tech & Factory Automation; vol. 2, 15, Oct. 2001, pp. 515-518; XP010589132.

PCT International Search Report, mailed Nov. 12, 2004, PCT/US04/25552.

PCT Cooperation Treaty—Written Opinion of the International Searching Authority, PCT/US04/25552.

Spera J: "Making sense of CMAX initiatives" electronic packaging and production, Cahner's Publishing Co., Newton, MA, US vol. 42, No. 11, Nov. 2002 (Nov. 2002), pp. 20-22, 24, XP001144938 ISSN: 0013-4945.

Communication from foreign patent office, dated Jun. 30, 2006, application 04 780 394.5.

* cited by examiner

METHOD FOR PROVIDING REAL-TIME PRODUCTION INFORMATION USING IN-SITU WEB SERVICES EMBEDDED IN ELECTRONIC PRODUCTION EQUIPMENT

This application is based on U.S. Provisional Application No. 60/494,716, filed on Aug. 13, 2003 and U.S. Provisional No. 60/494,715, filed on Aug. 13, 2003, and claims the benefit from these provisional applications for priority purposes.

BACKGROUND OF THE INVENTION

In the electronic manufacturing domain today, many companies spend a significant amount of money and effort to collect mountains of historical performance, condition, and usage data from production machine or equipment. The data collection method is partially semi-automatic and still relies heavily on manual entries by operators and maintenance or process technicians. Despite the fact that most production equipment is embedded in the factory network, due to different proprietary equipment interfaces (Ethernet, Serial RS232, etc.) and networking protocols, it is difficult to automate the data gathering process. In addition, the collected data is only valuable if it can be further processed, analyzed and the result can be turn into something conclusive for the entire business systems. Until now, system integrators always have to apply the "adapter technique" to integrate production equipment with all other enterprise applications. Each production machine requires a special adapter. This leads to a configuration management and maintenance nightmare, since every time a software version of the machine changes, the adapter might need to be changed as well.

"Web Services" is an emerging Internet technology concept to enable full collaboration between business functions and systems connected over the Web. Web Services allow business functions to be loosely integrated between enterprises and within enterprises. They provide a unifying programming model so that application integration inside and outside the enterprise can be done with a common approach, leveraging a common infrastructure. Thus, applications can be integrated more rapidly, easily and less expensively than ever before. Interoperability or the capacity of disparate systems to communicate and to share data seamlessly is the goal of Web Services.

Hence, there is a need to employ Web Services technology in electronic production equipment to deliver real-time operating data and production information to users.

SUMMARY OF THE INVENTION

An object of the invention is to fulfill the need referred to above. In accordance with the principles of the present invention, this objective is obtained by providing a method of communicating with electronics assembly equipment of a manufacturing process. The method provides web services, on computer readable medium, in the electronics assembly equipment. The web services include information relating to the equipment. The method ensures that the web services are accessible via Internet Protocol by a subscriber.

In accordance with another aspect of the invention, electronics assembly equipment includes a controller including computer readable medium having stored thereon, executable instructions defining at least one web service. The web service includes information relating to the equipment. The equipment also includes a web service interface associated with the controller so that the web service is accessible via Internet Protocol by a subscriber.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

The embodiment discloses electronic production equipment having embedded therein, "Web Services" technology to provide real-time operating data and production information to other subscribers.

A Web Service is a programmable application logic (e.g., executable code stored on computer readable medium) accessible using standard Internet protocols, or to put it another way, the implementation of Web-supported standards for transparent machine-to-machine, machine-to-application and application-to-application communication. Thus, the use of web services let businesses bridge communications gaps between software written in different programming languages, developed by different vendors or running on different operating systems. The computer readable medium can be, for example, a hard disk drive, a floppy drive, a random access memory, a read only memory, an EPROM, a compact disc, etc.

Figure 1:
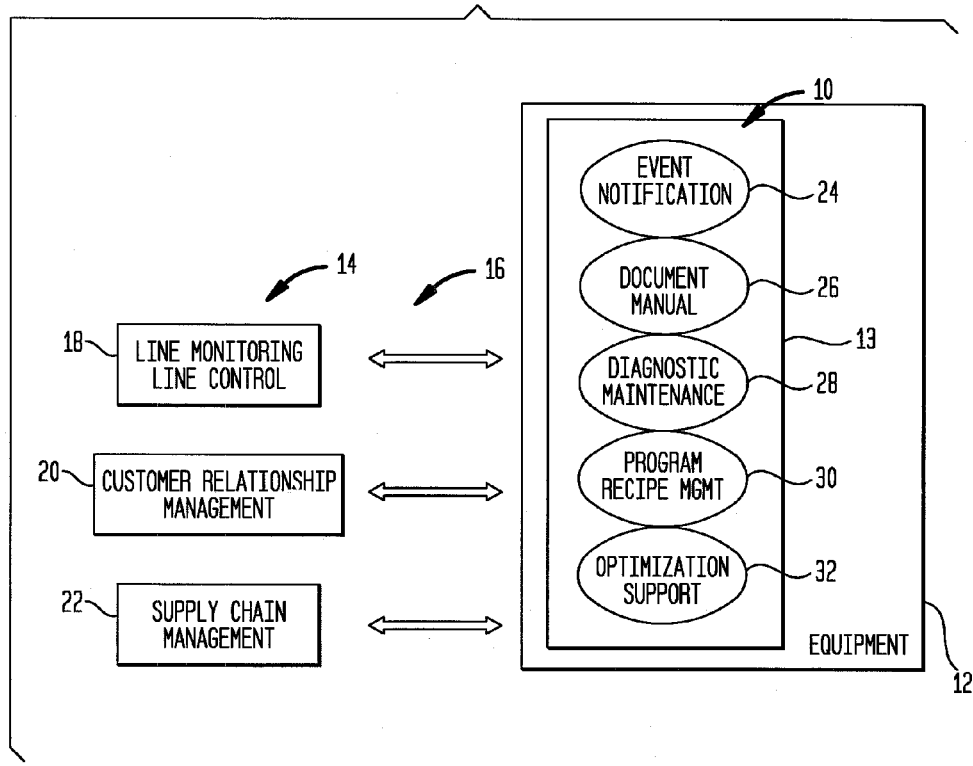
FIG. 1 is a schematic illustration Web Services embedded in electronic production equipment and accessible by subscribers in accordance with the principles of the invention.

With reference to FIG. 1, a plurality of Web Services, generally indicated at 10, is embedded in or associated with a controller 13 of equipment 12. The equipment 12 is preferably equipment used in electronics manufacturing such as placement machines for circuit board production, but can be any electronic production equipment. As shown in FIG. 1, the Web Services 10 are interfaced with subscriber or user enterprise applications, generally indicated at 14, via a web service interface, generally indicated at 16. Examples of user enterprise applications include Line Monitoring and Line Control 18, Customer Relationship and Management 20, and Supply Chain Management 22. These enterprise applications 14 can be provided on a computer located in the factory containing the equipment 12, or in a location remote from the factory. The Web service interface 16 is preferably an extensible markup language (XML), hypertext transport protocol (HTTP) or Simple Object Access Protocol (SOAP) interface.

The following five requirements have been defined for service-based development:

a. A standard way to represent data b. A common, extensible, message format c. A common, extensible, service description language d. A way to discover services located on a particular Web site e. A way to discover service providers XML is a good choice for a standard way to represent data. Most Web Service-related specifications use XML for data representation, as well as XML Schemas to describe data types. SOAP defines a lightweight protocol for information exchange. Part of the SOAP specification defines a set of rules for how to use XML to represent data. Other parts of the SOAP specification define an extensible message format, conventions for representing remote procedure calls using the SOAP message format, and bindings to the HTTP protocol.

There is a standard way to document what messages the Web Service 10 accepts and generates, that is, to document the Web Service contract. The Web Services Description Language (WSDL) is an XML-based contract language, which is a standard mechanism for developers and developer tools to create and interpret contracts. A Web Service is described using an XML-based service description. The service description covers all the details necessary to interact with the service, including message formats, transport protocols and location. The description hides the implementation details of the service. To communicate with other partners (e.g., enterprise applications 14) in the collaborative network, a Web Service interface is defined strictly in terms of the messages the Web Service accepts and generates. Consumers of the Web Service can be implemented on any platform in any programming language, as long as they can create and consume the messages defined for the Web Service interface.

The Web Services architecture is based upon the interactions between three roles: service provider, service registry and service requester, and three operations: publish, find, and bind. In a typical scenario, a service provider hosts a network-accessible software module (an implementation of a Web Service). The service provider defines a service description for the Web Service and "publishes" it to a service requestor or service registry. The service requestor uses a "find" operation to retrieve the service description and uses the service description to "bind" and interact with the Web Service implementation.

Figure 2:
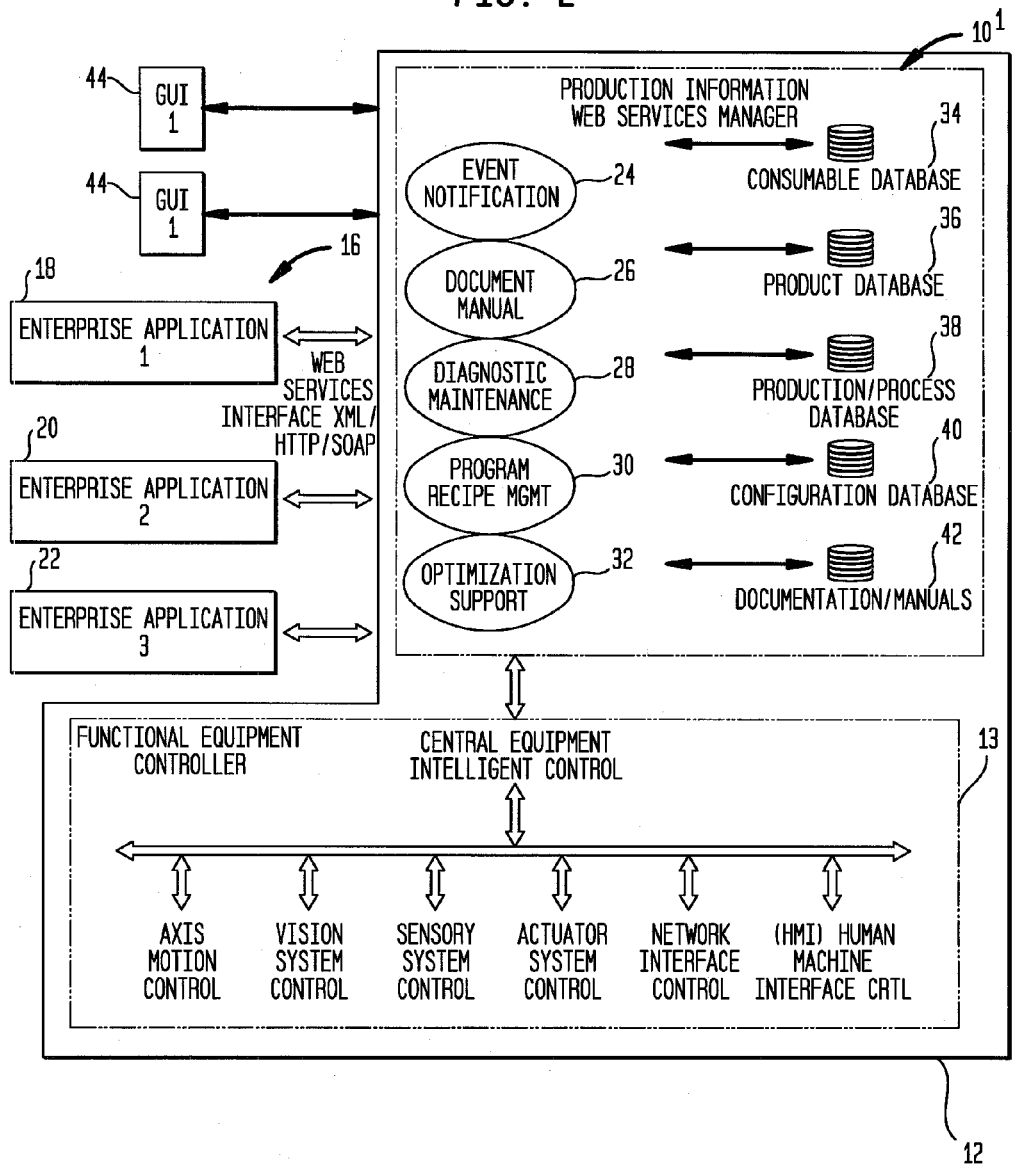
FIG. 2 is a detailed schematic illustration Web Services embedded in electronic production equipment and accessible by subscribers in accordance with the principles of the invention.

FIG. 2 is a more detailed schematic of FIG. 1 showing equipment 12 having Web Services 10 embedded therein. As shown, the equipment 12 includes the functional equipment controller 13. The typical electronic equipment controller 13 contains mainly functional oriented components or subsystems such as axis or motion control, sensor and actuator system control, vision system control, network/interface control, human-machine interface control together with a central intelligent processing unit. In this traditional and conventional architecture, the communication channel(s) are still mainly managed by the network/interface control subsystem. The exchange of Consumable, Product, Production Process, Configuration and Documentation data and information still needs to be processed within the limitation of this subsystem regarding method of transport and delivery (automatic, event-triggered, self-delivering), syntax (data format, data package) and content (information substance, self-description).

In accordance with the embodiment, Production Information Web Services Manager (PIWSM) 10' is an addition to the main architecture. The PIWSM 10' reduces the core function of the traditional network/interface sub-module to a minimum, which is merely the control of hardware interface. All communication contents are delivered via Web Services. As shown, the PIWSM 10' includes Web Services 24, 26, 28 30 and 32, the function of which will be explained below. The PIWSM 10' also includes a number of databases accessible via the interface 16. For example, databases such as Consumable Database 34, Product Database 36, Production/Process Database 38, Configuration Database 40 and Documentation/Manuals Database 42 are provided. These databases are exemplary and other databases can be provided. Although the PIWSM 10' is shown as an add-on to the conventional architecture, it can be appreciated that the PIWSM 10' can be considered to be part of the controller 13 architecture. The PIWSM 10' is accessible via web services interface 16 to the enterprise applications 18, 20 and 22. In addition, the PWISM 10' is accessible via Graphical User Interfaces 44 (GUI) or portals.

Typical external communication functions delivered by a traditional equipment controller 13 today are event notification and/or coverage. The Web Service "Event Notification" 24 replaces these functions. Basic informational Web Service for Documentations and Manuals 26 provide up-to-date documentation, and multi media support for operator training and qualification. More sophisticated Web Services have been also created to display the potential extension of the delivery scope of equipment information such as diagnostic, trouble-shooting, remote monitoring support 28, program (recipe) management 30 and even operational optimization support 32.

Thus, with reference to FIGS. 1 and 2, examples of Web Services 10 of the PIWSM 10' embedded in the equipment 12 are:

1. Event Notification and Report 24: provides related equipment data every time an event at the equipment occurs.

2. Documentation/Manual 26: provides information update to subscribers every time a documentation change regarding the equipment has been notified or by request.

3. Diagnostic/Maintenance Support 28: provides pre-defined relevant equipment health or maintenance parameters to subscribers every time an "impactor" (significant health/maintenance operating event) occurs, or by request.

4. Recipe Management 30: One key issue for electronic manufacturer is the preparation work package related to the introduction of a new product (NPI) or an engineering change order (ECO). Normally, process engineers have to spend a significant amount of time to create recipes for the production line from the design data such as CAD output, BOM (Bill-Of-Material) and material data such as component shape data etc. After its generation, the recipe needs to go through the optimization cycle with several test runs directly on the line, which results in a significant loss of valuable production time. By offering this service remotely, for the program generation as well as for the tests, electronic capital equipment vendors (ECEVs) can help their customers reduce the painful and very time-consuming workload. Thus, this service provides (by request) information of all recipes related to products or work items processed by the equipment. This service also contains detailed analysis such as production performance related to each recipe, defect level (DPMO) per recipe, Process Capability (Cp) and Machine Capability Index (Cpk) per recipe (see TABLE 1 below), and derating grade per recipe.

TABLE 1

Terminology

| Name | Description |
|---|---|
| Defects per Million Opportunities DPMO (The total number of defects divided by the total number of opportunities for a defect multiplied by 1,000,000) | DPMO = Defects per million opportunities<br>DO = Number of defect opportunities<br>Defect = Number of defects found<br>Boards = Number of boards inspected<br><br>DPMO = Defect/((Boards*DO)/1,000,000)<br><br>Example:<br>If a product has 500 part positions and 3,000 joints, the total defect opportunities are 3,500 per product<br>If there have been 40 defects after 100 products, then the DPMO is calculated as:<br>DPMO = 40/((100*3500)/1,000,000)<br>DPMO = 114 |
| Process Capability (Cp) | Cp is a simple process capability index that relates the allowable spread of the spec limits (spec range or the difference between the upper spec limit, USL, and the lower specification limit, LSL) to the measure of the actual, or natural, variation of the process, represented by 6 sigma, where sigma is the estimated process standard deviation. Cp is often referred to as process "potential". $$\text{Process Capability (Cp)} = \frac{\text{Allowable Process Spread (USL} - \text{LSL)}}{\text{Actual Process Spread (6 sigma)}}$$ |
| Cpk | Capability index that considers centering of the process variability with respect to the specification. While Cp relates the spread of the process relative to the specification width, it does not address how well the process average is centered to the target value. Cpk measures not only the process variation with respect to allowable specifications, it also considers the location of the process average. |

5. Performance Optimization 32: provides by request recommended set up information, statistical process control limit and/or trouble shooting guidelines based on process rules using existing knowledge stored in the product/process database. This service supports customers in the monitoring of current operational performances at the production line or factory level. By using real-time capabilities and the ECEV support services, manufacturers can track jobs status in the factory workflow and master the complex task of permanent update shop floor schedule and real-time dispatching every time events occur. This service can also be used to notify the customer about other optimization possibilities in their factory related to workflow, logistics, resource balancing, or synchronizing activities across resources. A simple example is the possibility to review and adjust the "line balancing" strategy due to the introduction of a new product family for a key customer . . . . This large list of opportunities for professional services will increase the number of customer touch-points, thus the potential improvement of the customer relationship.

Other Web Services not shown in FIGS. 1 and 2 may include:

6. Real-time Monitoring and Analysis: This service supports customers in the monitoring of key performances at the equipment level in the factory. A leading electronic capital equipment vendor (ECEV) can make use of their very large machine install base to offer this comprehensive service. Many companies usually collect mountains of data from their plant floor, but due to many known reasons (mentioned in earlier paragraphs), these data are not analyzed and processed further. ECEVs can provide the interpretation and explanation for the data and its relationship to the operations. An example is a downtime analysis service, which could help customer to understand the reasons for the equipment availability in their factory.

7. Predictive Maintenance: Instead of performing their own regular and sometimes costly preventive maintenance tasks, customers could rely on the predictive maintenance services offered by the ECEV. This fact-based predictive maintenance concept relies on actual, real-time data collection. The comparison with trend data from the history and with the internal knowledge-base (e.g. MTBF data for the main parts) will allow the vendor to diagnose potential problems and to determine the degree of equipment performance degradation, so that the customer can be alarmed before severe damage or shutdown occurs. This service can start with the maintenance monitoring, the easiest and most straightforward service, to ensure that required maintenance intervals are followed. ECEV support personnel can simultaneously see its machinery in various locations and track its important operating parameters. The main target is to alert customers about impending preventive maintenance data as well as data for potential needed part replacement. The concept of real-time, closed-loop and forward-looking process control system to prevent defects from occurring in production lines or manufacturing cells is described in more detail in my co-pending U.S. application Ser. No. 10/899,406 entitled, "Real Time Closed-Loop Process Control System for Defect Prevention", the contents thereof is hereby incorporated into the present specification by reference.

8. Equipment Lifecycle Management: This is the bundling of many equipment related services, starting after its procurement until its discontinuation. It's a big picture approach for resource management covering the duration of equipment life. The high-end electronic production equipment tends to outlive the products and processes they are primarily design for, therefore an equipment lifecycle management could become a good business practice and valuable service for customers. Industry data showed that a significant part of all installed equipment is under-used, or idle. This is also a motivation for this type of service, which can be highly requested and appreciated during the downturn. Featuring this service, an ECEV can penetrate the second-hand equipment market and target a new customer segment. This can help them understand better the needs of these potential customers, who can evolve themselves in the future.

9. Performance guarantee services: Guarantee is the highest-level of commitment of a producer toward his customers. Due to the dominance of the electronic assembly equipment in a production environment (not from the costs, but also from the overall performance point-of-view) the manufacturer strongly relies on the ECEV product and service capabilities. A well-designed performance guarantee structure could be a strategic lever to provide manufacturer the peace-of-mind, together with the impression that "this EACEV is easy to work with . . . " There are a variety of manufacturers' types because of their different operating characteristics and specific conditions. For example, one manufacturer can be more self-sufficient than other etc. Therefore, performance guarantees have to be offered on various levels: Machine level: guarantee of machine parameters like accuracy, throughput etc. Line/Cell level: "aggregated guarantee" of line throughput, or yield or defect level of the line etc. Finished product level: guarantee of finished product output (quantity and quality) etc. These levels of performance guarantee determine the mixture of needed services. The performance guarantee portfolio can be developed over time based on the current organizational ability and common market practice.

From the architectural point-of-view, Web Services 10 are Interfaces that describe a collection of operations that are network-accessible through standardized XML/HTTP/SOAP messaging. To show the platform and language independence as well as the collaborative effect of the embodiment, the Web Services 10 and enterprise applications 18, 20 and 22 have been developed in different programming languages (VB, Java) and operating system platforms (Windows, Unix . . . ).

Thus, the PIWSM 10' enable sophisticated communication and reporting capabilities that can extract the right information for the right user group and the ability to link to a variety of business applications. This is an important component in the era of collaborative manufacturing and real time performance management. Enterprise applications only deliver timely and accurate results as the data feeding them. The PIWSM 10' provides simultaneous connections, turns data from equipment in the factory into information and delivers it directly to all different applications, such as field service automation; call center applications, and customer relationship management systems.

The PISWM 10' is configured to facilitate predictive maintenance and accurate tracking of billable consumables and support services as well as monitor the usage of production and assembly equipment or devices. The embodiment also supports remote diagnostics and remote equipment monitoring, and can be implemented to scrutinize usage within the enterprise as well as establish real-time communications between the manufacturer and suppliers of repair and maintenance services for production equipment.

With focus on customer's manufacturing operations efficiency, an electronic capital equipment vendor (ECEV) realizes that maintenance is a strategic weapon and that by selling equipment they are also selling a range of services. The larger the installed base is, the better the service business can become. Maintenance is the kernel of the service package. With real-time information generated by the equipment, ECEV personnel can monitor the performance of their installed equipment in the field and take care of them before they fail. Furthermore, the scope of maintenance service can be extended toward predictive maintenance, which offers customer more flexibility at optimized cost than the traditional preventive practice. Thus, improved equipment reliability and reduce maintenance costs are realized with predictive technology, where current and historical equipment data can be used to model the performance of equipment to predict and prevent failures. This is a blend of service technology and field service execution capabilities.

This business model can help production equipment vendors differentiate themselves in the already mature marketplace.

The embodiment provides a methodology based on the implementation of Web Services 10 to generate accurate and timely (real-time) production information directly from the electronic production equipment 12, without having to use any type of adapter, interpreter or wrapper technique. The web hosted services 10 are accessible by subscribers locally or remotely via Internet protocol through a web service provider.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of communicating with electronics assembly equipment of a manufacturing process including the steps of:
   providing web services as self-describing programmable application logic, on computer readable medium, in the electronics assembly equipment, the web services including information relating to the equipment, and
   ensuring the web services are accessible via Internet Protocol by a subscriber regardless of operating platform and programming language of the subscriber, and without requiring the subscriber to use a web browser.

2. The method of claim 1, wherein the ensuring step includes providing an interface to access the web services.

3. The method of claim 2, wherein the interface is provided as one of an extensible markup language (XML), hypertext transport protocol (HTTP) and Simple Object Access Protocol (SOAP) interface.

4. The method of claim 1, wherein the web services are executable instructions on the computer readable medium, and the providing step includes providing the computer readable medium in a controller of the equipment.

5. The method of claim 4, wherein information of the web services is represented by extensible markup language (XML).

6. The method of claim 1, wherein at least one of the web services includes information relating to an occurrence of an event at the equipment.

7. The method of claim 1, wherein at least one of the web services includes information relating to a document change regarding documentation of the equipment.

8. The method of claim 1, wherein at least one of the web services includes information relating to a maintenance parameter of the equipment.

9. The method of claim 1, wherein at least one of the web services includes information regarding recipes relating to items processed by the equipment.

10. The method of claim 1, wherein at least one of the web services includes information regarding present operational performance at a production line level.

11. The method of claim 1, wherein the equipment is an electronic component placement machine.

12. The method of claim 1, further providing a plurality of databases in the equipment accessible via an interface.

13. Electronics assembly equipment comprising:
   a controller including computer readable medium having stored thereon
   executable instructions defining at least one web service as self-describing programmable application logic, the web service including information relating to the equipment, and
   a web service interface associated with the controller so that the web
   service is accessible via Internet Protocol by a subscriber regardless of operating platform and programming language employed by the subscriber, and without requiring the subscriber to use a web browser.

14. The equipment of claim 13, wherein the computer readable medium has stored thereon, a plurality of web services.

15. The equipment of claim 14, wherein at least one of the web services includes information regarding present operational performance at a production line level.

16. The equipment of claim 14, wherein at least one of the web services includes information relating to an occurrence of an event at the equipment.

17. The equipment of claim 14, wherein at least one of the web services includes information relating to a document change regarding documentation of the equipment.

18. The equipment of claim 14, wherein at least one of the web services includes information relating to a maintenance parameter of the equipment.

19. The equipment of claim 14, wherein at least one of the web services includes information regarding recipes relating to items processed by the equipment.

20. The equipment of claim 13, wherein the web service interface is one of an extensible markup language (XML), hypertext transport protocol (HTTP) and Simple Object Access Protocol (SOAP) interface.

21. The equipment of claim 13, wherein the equipment is an electronic component placement machine.

22. The equipment of claim 13, wherein the equipment further includes a plurality of databases accessible via the interface.

* * * * *